(12) United States Patent
Shioguchi

(10) Patent No.: US 11,941,317 B2
(45) Date of Patent: Mar. 26, 2024

(54) DISPLAY CONTROLLING METHOD

(71) Applicant: Faurecia Clarion Electronics Co., Ltd., Saitama (JP)

(72) Inventor: Takuma Shioguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 69 days.

(21) Appl. No.: 17/867,940

(22) Filed: Jul. 19, 2022

(65) Prior Publication Data

US 2023/0028924 A1 Jan. 26, 2023

(30) Foreign Application Priority Data

Jul. 26, 2021 (JP) .................. 2021-121680

(51) Int. Cl.
*G06F 3/14* (2006.01)
*G06F 3/0488* (2022.01)

(52) U.S. Cl.
CPC ............ *G06F 3/1446* (2013.01); *B60K 35/60* (2024.01); *G06F 3/0488* (2013.01); *B60K 35/22* (2024.01); *B60K 2360/1526* (2024.01)

(58) Field of Classification Search
CPC ...... B60K 37/02; G06F 3/1446; G06F 3/0488
See application file for complete search history.

(56) References Cited

U.S. PATENT DOCUMENTS

| 2009/0160731 A1* | 6/2009 | Schuler ................ G06F 3/1423 |
| | | 345/1.1 |
| 2015/0153936 A1 | 6/2015 | Lim et al. |
| 2015/0253974 A1 | 9/2015 | Young et al. |
| 2018/0150201 A1 | 5/2018 | Kakinuma et al. |
| 2020/0101846 A1 | 4/2020 | Kamada |

FOREIGN PATENT DOCUMENTS

| EP | 3254882 A2 | 12/2017 |
| JP | 2011-193040 A | 9/2011 |
| JP | 2020-55328 A | 4/2020 |

* cited by examiner

*Primary Examiner* — Charles Tseng
(74) *Attorney, Agent, or Firm* — IP Business Solutions, LLC

(57) ABSTRACT

A display detects a movement operation that is a touch operation that has been set in advance on a first screen, and, upon detection of the movement operation, evaluates which, a left small display region, among left left small display regions through, set in a second screen, has been selected, and displays, in the display region that was evaluated as selected, a display image that has been displayed in the first screen.

5 Claims, 13 Drawing Sheets

DISPLAY CONTROLLING METHOD

CROSS-REFERENCE TO RELATED APPLICATIONS

The present application claims priority under 35 U.S.C. § 119 to Japanese Patent Application No. 2021-121680 filed on Jul. 26, 2021. The content of the application is incorporated herein by reference in its entirety.

BACKGROUND OF THE INVENTION

Field of the Invention

The present invention relates to a display controlling method.

Description of the Related Art

In recent years, displays that are long in the horizontal direction, reaching from the driver seat side to the passenger seat side, have been installed in motor vehicles.

For example, Patent Document 1 discloses a touch panel display that is structured from a plurality of touch panel displays and meters.

PRIOR ART REFERENCES

Patent Documents

[Patent Document 1] Japanese Unexamined Patent Application Publication 2020-55328

SUMMARY OF THE INVENTION

However, when a display that is long in the horizontal direction, such as in Patent Document 1, is installed in a vehicle, there is a region of the display that cannot be reached by a driver who is seated in the driver seat, so there will be situations wherein a touch operation is difficult. Because of this, there is the need to improve the ease of touch operations.

The present invention was created in contemplation of the situation set forth above, and the object thereof is to improve the ease of touch operations.

In order to achieve the object set forth above, the display controlling method according to the present invention is a display controlling method for controlling the display of a first screen and a second screen, including: a detecting step for detecting a predetermined touch operation on a first screen; an evaluating step for evaluating which display region has been selected by the predetermined touch operation among a plurality of display regions set on the second screen in response to the detection of the predetermined touch operation; and a displaying step for displaying, a display image in the display region evaluated as having been selected by the evaluating step, the display image is an image that has been displayed in the first screen.

Effects of the Invention

The present invention enables an improvement in ease of touch operations.

DETAILED DESCRIPTION OF THE INVENTION

In the below an embodiment according to the present invention will be explained in reference to the drawings.

Figure 1:
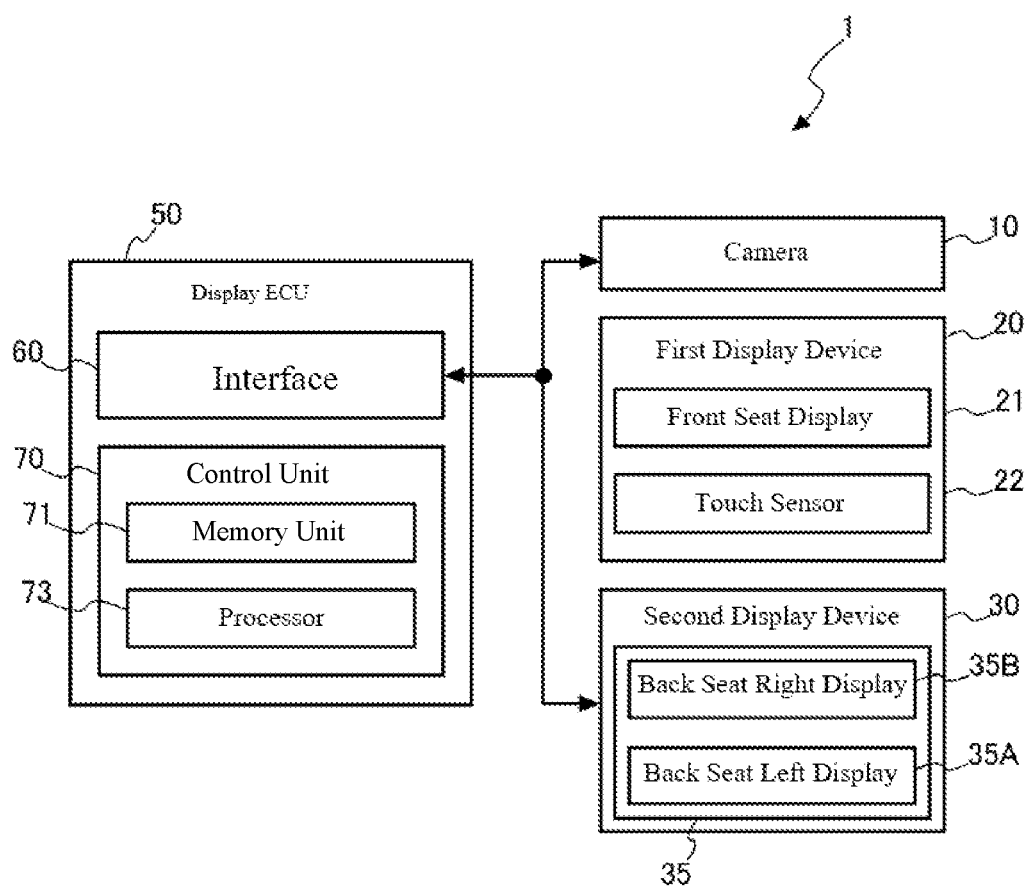
FIG. 1 is a diagram depicting the overall structure of a display system.

FIG. 1 is a diagram depicting the overall structure of a display system 1.

The display system 1 comprises cameras 10, a first display device 20, a second display device 30, and a display ECU 50.

Cameras 10 are equipped on, for example, the front, rear, left, and right sides of the vehicle, to capture images of the front, rear, left, and right sides of the vehicle in the corresponding directions.

Each camera 10 comprises an image sensor, such as a CCD (Charge-Coupled Device) or CMOS (Complementary Metal-Oxide-Semiconductor), or the like, and a data processing circuits for generating a captured image from the state of light reception of the image sensor. The camera 10 outputs, to the display ECU 50, the captured image that is generated through imaging.

Figure 2:
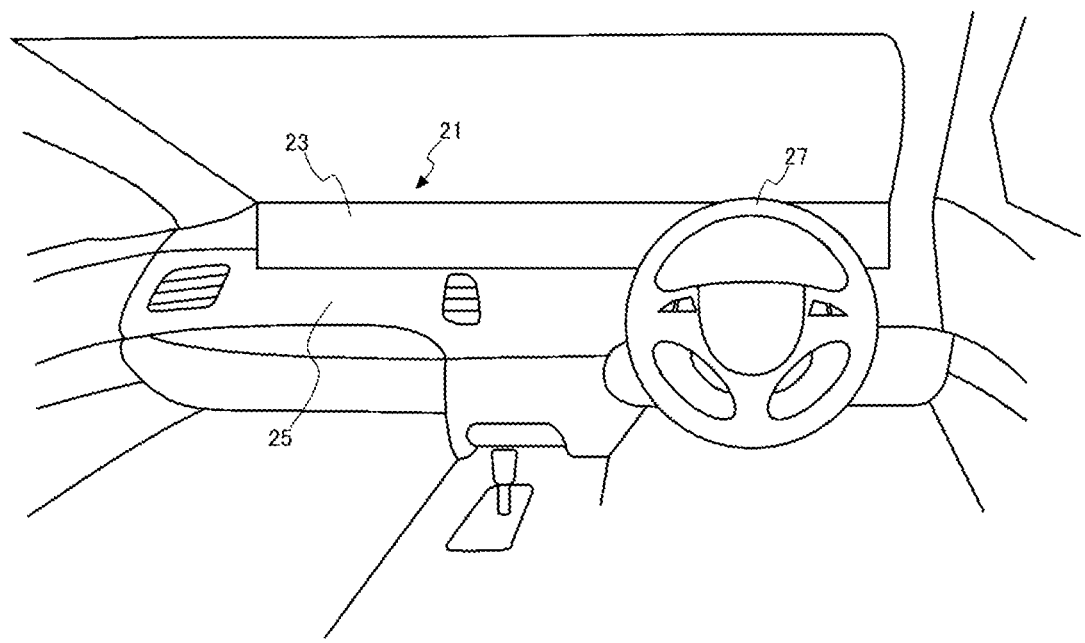
FIG. 2 is a diagram depicting a layout for a front seat display.

FIG. 2 is a diagram depicting the layout of the front seat display 21 in the vehicle.

The first display device 20 comprises a front seat display 21 and a touch sensor 22.

The front seat display 21 comprises an LCD (Liquid Crystal Display), or the like, to display various images under the control of the display ECU 50. The various images include, for example, the captured images from the cameras 10, and images of various types of meters (including a speedometer), navigation images, and the like.

The front seat display 21 is arranged across the vehicle-width direction of the vehicle in an upper portion of the dashboard 25, as depicted in FIG. 2. The front seat display 21 comprises a display surface 23. A variety of images are displayed in the display surface 23. The display surface 23 is arranged facing toward the rear of the vehicle. The display surface 23 is a flat rectangle. Note that the display surface 23 may instead be a curved surface that is formed with one edge of the rectangular plane curved into an arc shape. That is, the display surface 23 may be a curved surface that structures a portion of a peripheral surface of a round cylinder.

In the display surface 23, the size in the crosswise direction is large when compared to the size in the vertical direction. For example, the size in the crosswise direction is in a range of between 3 times and 20 times the size in the vertical direction. Specifically, the size of the display surface 23 in the vertical direction is, for example, 100 mm, and the size in the crosswise direction is, for example, 1000 mm.

The touch sensor 22 detects a touch operation on the front seat display 21, and outputs to the display ECU 50, as operation information, coordinates indicating the touch position of the detected touch operation. The coordinates are coordinates in a coordinate system that is set in the front seat display 21.

The second display device 30 comprises a back seat display 35, to display various images under control of the display ECU 50. The back seat display 35 includes a back seat right display 35B and a back seat left display 35A.

The back seat right display 35B is disposed, facing toward the back of the vehicle, in the head rest of the driver seat, for example. That is, the back seat right display 35B is attached so as to enable viewing of the screen of the back seat right display 35B by a passenger who is seated in the back seat, on the driver seat side, facing forward.

The back seat left display 35A is disposed facing the rear of the vehicle in the head rest of, for example, the passenger seat. That is, the back seat left display 35A is attached so as to enable viewing of the screen of the back seat left display 35A by a passenger who is seated in the back seat, on the passenger seat side, facing forward.

The display ECU 50 comprises an interface 60 and a control unit 70, and executes control, in accordance with the display controlling method, to display images on the front seat display 21 and the back seat displays 35.

An interface 60 is connected to an onboard LAN (Local Area Network) such as a CAN (Controller Area Network) or an onboard Ethernet®, or the like. The interface 60 carries out data communication between the cameras 10, the first display device 20, and the second display device 30, through the onboard LAN. Additionally, other ECUs, for controlling the engine or the vehicle, are connected to the onboard LAN, and the interface 60 carries out data communications with these other ECUs as well.

The control unit 70 is a computer device comprising a memory unit 71 and a processor 73.

The memory unit 71 is a memory device for non-volatile storing of data and programs be executed by the processor 73, and the like. The memory unit 71 is structured from a magnetic storage apparatus, a semiconductor storage element such as a flash ROM (Read-Only Memory), or another type of non-volatile memory device. Additionally, the memory unit 71 may include a RAM (Random Access Memory) for structuring a working area for the processor 73. The memory unit 71 stores data that is to be processed by the display ECU 50, control programs to be executed by the processor 73, and the like.

Additionally, the memory unit 71 also stores vehicle attribute information and screen setting information.

The vehicle attribute information is information indicating the configuration state of the display devices in the vehicle. In the present embodiment, the display devices are the first display device and the second display device. The control unit 70 references the attribute information to evaluate whether the display devices are configured in only a first row in the vehicle, or whether they are configured in a second row as well.

The screen setting information is information indicating the ranges of each of the screens, for a first screen 110, a second screen 120, and a third screen 130, that are set in the display surface 23 of the front seat display 21. Each of the screens, for the first screen 110, the second screen 120, and the third screen 130, will be described below in reference to FIG. 3.

In the present embodiment, the individual screens, the first screen 110, the second screen 120, and the third screen, are structured by dividing the display surface 23 of the front seat display 21 into a plurality of screens. The control unit 70 references the screen setting information to set each of these screens, the first screen 110, the second screen 120, and the third screen, in the front seat display 21.

The processor 73 may be structured from a single processor, or may be structured from a plurality of processors to function as the processor 73.

The control unit 70 detects a touch operation on the first screen 110, and, based on the detected touch operation, controls the images that are displayed in the front seat display 21 and the back seat displays 35. Here the screens that are set in the front seat display 21 will be explained in reference to FIG. 3.

Figure 3:
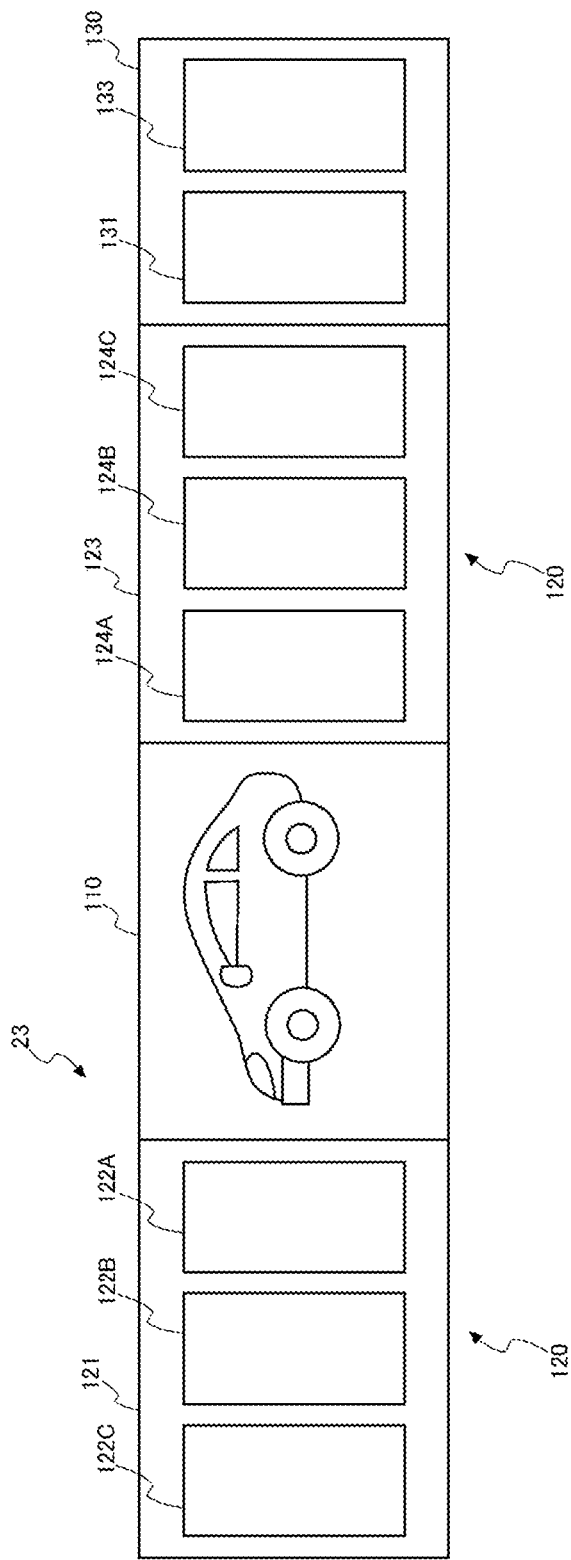
FIG. 3 is a diagram depicting a plurality of screens that are set in a display surface.

FIG. 3 is a diagram depicting a plurality of screens that are set in the display surface 23.

The display surface 23 of the front seat display 21 is divided into a plurality of screens. The control unit 70 controls the display of images for each of the screens.

The display surface 23 of the front seat display 21 is divided into three regions: the first screen 110, the second screen 120, and the third screen 130. While, in the present embodiment, a case will be explained wherein the display surface 23 of the front seat display 21 is divided into three screens, the number of divisions of the display surface 23 of the front seat display 21 may be two, or may be four or more.

The first screen 110 is a region for receiving a touch operation from a vehicle occupant, and is positioned between the driver seat and the passenger seat, set in a range of the display surface 23 that can be reached by the left hand of the driver in the driver seat. Additionally, while the below is an explanation of a case wherein the touch operation is carried out by the driver, the touch operation on the first screen 110 may instead be carried out by a passenger in the passenger seat.

The first screen 110 is a region wherein a display image is displayed first. That is, the display image that is displayed in the first screen 110 is moved, through a driver operation, to the second screen 120 or the third screen 130. An operating screen, such as a home screen, or a music playback screen, a map, a captured image by a camera, or the like, is displayed in the first screen 110. These screens or images will be termed a "display image" in the below. The home screen is a menu screen for selecting music playback, map display, a camera image, or the like.

The second screen 120 has a second left screen 121, which is positioned to the left side of the first screen 110 (when viewed from the driver seat), and a second right screen 123 that is positioned on the right side of the first screen 110 (when viewed from the driver seat).

That is, second screens 120 are disposed on both sides of the first screen 110. In the below, "second screen 120" will be used as a general term for the second left screen 121 and 120B. The second left screen 121 is arranged on the display surface 23 so as to be positioned, for example, to the front of a passenger that is seated in the passenger seat. The second right screen 123 is arranged on the display surface 23 so as to be positioned in front of the driver. The second right screen 123 is a region wherein the ease of the touch operation is inferior to that of the first screen 110, due to interference by the steering wheel 27, when the driver performs a touch operation.

A plurality of small display regions is displayed in the second left screen 121.

Three small display regions, that is, a first left small display region 122A, a second left small display region 122B, and a third left small display region 122C, are displayed in the second left screen 121. In the below, "left small display region 122" will be used as a general term for the first left small display region 122A, the second left small display region 122B, and the third left small display region 122C. The first left small display region 122A is arranged to the right side of the second left screen 121 when viewed from the driver seat. The second left small display region 122B is arranged in the center of the second left screen 121 when viewed from the driver seat. The third left small display region 122C is arranged on the left side of the second left screen 121 when viewed from the driver seat.

While in the present embodiment three left small display regions 122 are set in the second left screen 121, the number of left small display regions 122 is arbitrary.

In the second left screen 121, the first left small display region 122A, the second left small display region 122B, and the third left small display region 122C, a selecting sequence is set based on the distance from the first screen 110.

For the distance from the first screen 110, the second left screen 121 is the closest, after which the first left small display region 122A, the second left small display region 122B, and the third left small display region 122C are sequentially further from the first screen 110. In the second left screen 121 and left small display region 122, the selecting sequence is set from nearest to farthest for the distances from the first screen 110.

A plurality of small display regions is displayed in the second right screen 123 as well.

Three small display regions, that is, a first right small display region 124A, a second right small display region 124B, and a third right small display region 124C are displayed in the second right screen 123. In the below, "right small display region 124" will be used as a general term for the first right small display region 124A, the second right small display region 124B, and the third right small display region 124C. The first right small display region 124A is arranged to the left side of the second right screen 123 when viewed from the driver seat. The second right small display region 124B is arranged in the center of the second left screen 121 when viewed from the driver seat. The third right small display region 124C is arranged on the right side of the second right screen 123 when viewed from the driver seat.

While in the present embodiment three right small display regions 124 are set in the second right screen 123, the number of right small display regions 124 is arbitrary.

In the second right screen 123, the first right small display region 124A, the second right small display region 124B, and the third right small display region 124C, a selecting sequence is set based on the distance from the first screen 110.

For the distance from the first screen 110, the second right screen 123 is the closest, after which the first right small display region 124A, the second right small display region 124B, and the third right small display region 124C are sequentially further from the first screen 110. In the second right screen 123 and right small display region 124, the selecting sequence is set from nearest to farthest for the distances from the first screen 110.

Moreover, a third screen 130 is arranged to the right side of the second right screen 123 when viewed from the driver seat. A first small display region 131 and a second small display region 133 are displayed in the third screen 130. The display image that is displayed in the back seat display 35 is displayed in the third screen 130. Specifically, when a display image is displayed in the back seat right display 35B, the same display image is displayed in the second small display region 133 as well, and when a display image is displayed in the back seat left display 35A, the same display image is displayed in the first small display region 131 as well.

While, in the present embodiment, the explanation is for a structure wherein a third screen 130 is provided in the front seat display 21, if the vehicle structure is one wherein no second display device 30 is provided in the back seat of the vehicle, the display surface 23 of the front seat display 21 may be divided into a first screen 110, a second left screen 121, and a second right screen 123.

Additionally, if the vehicle has three rows of seats (a first row, a second row, and a third row), and displays are provided for each of the rows, the display surface 23 of the front seat display 21 may be divided into a first screen 110, a second left screen 121, a second right screen 123, a third screen 130, and a fourth display region.

Moreover, while the present embodiment explains a case wherein the second screen 120 is divided into two screens (the second left screen 121 and the second right screen 123), the second screen 120 may instead be structured from a single screen.

A method for changing the display position of the display image through a touch operation will be explained next.

The control unit 70, based on operation information inputted from the touch sensor 22, detects a touch operation on the first screen 110. Upon detection of the touch operation, the control unit 70 evaluates the direction of movement of the touch position through the touch operation that is detected. The movement directions of the touch position evaluated by the control unit 70 include a first direction, in a second direction, and a third direction.

The first direction is the direction of movement of the touch position from the bottom toward the top of the first screen 110.

Additionally, the second direction is the direction of movement of the touch position in the horizontal direction of the first screen 110, where the detection by the control unit 70 discriminates between an operation wherein the touch position is moved from the left toward the right of the first screen 110 and an operation wherein the movement is from the right toward the left. The third direction is the direction of movement of the touch position from the top toward the bottom of the first screen 110.

Figure 4:
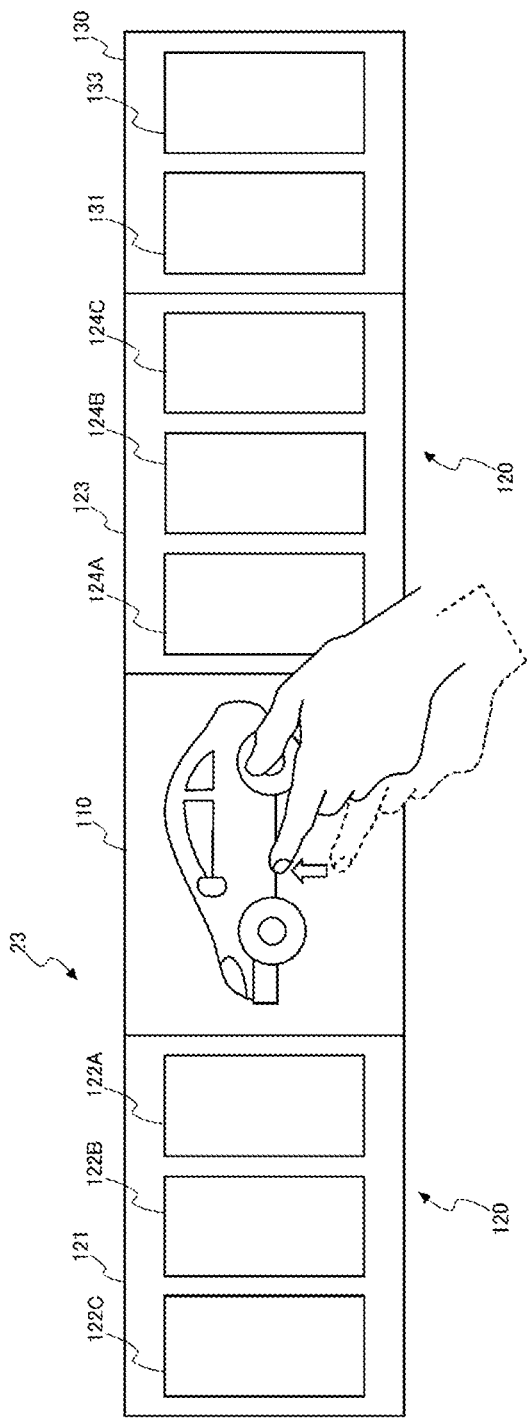
FIG. 4 is a diagram depicting a touch operation of a first direction.

FIG. 4 is a diagram depicting a touch operation of the first direction.

When moving a display image that is displayed in the first screen 110 to the second screen 120 or the third screen 130, the driver first uses a touch operation to cause a guide image 200 to be displayed in the first screen 110. The guide image 200 is an image that shows the displayed state of display images in the second screen 120, the third screen 130, the left small display region 122, and the right small display region 124. That is, the guide image 200 is an image showing whether or not display images are displayed in the second screen 120, the third screen 130, the left small display region 122, and the right small display region 124.

The operation for causing the guide image 200 to be displayed shall be termed a "display operation." The display operation corresponds to a touch operation on the first screen 110 that is different from a touch operation that has been set in advance.

The display operation is an operation wherein the finger of the driver touches the first screen 110 and the finger that is touching is moved in the first direction. While, in the in the present embodiment, the explanation is for a case wherein the first direction is the direction wherein the finger of the driver is moved from the top of the first screen 110 toward the bottom, the first direction is not limited to this direction. For example, the direction wherein the finger of the driver moves from the bottom of the first screen 110 toward the top may be defined as the first direction, or a left rotation or a right rotation may be defined as the first direction.

Figure 5:
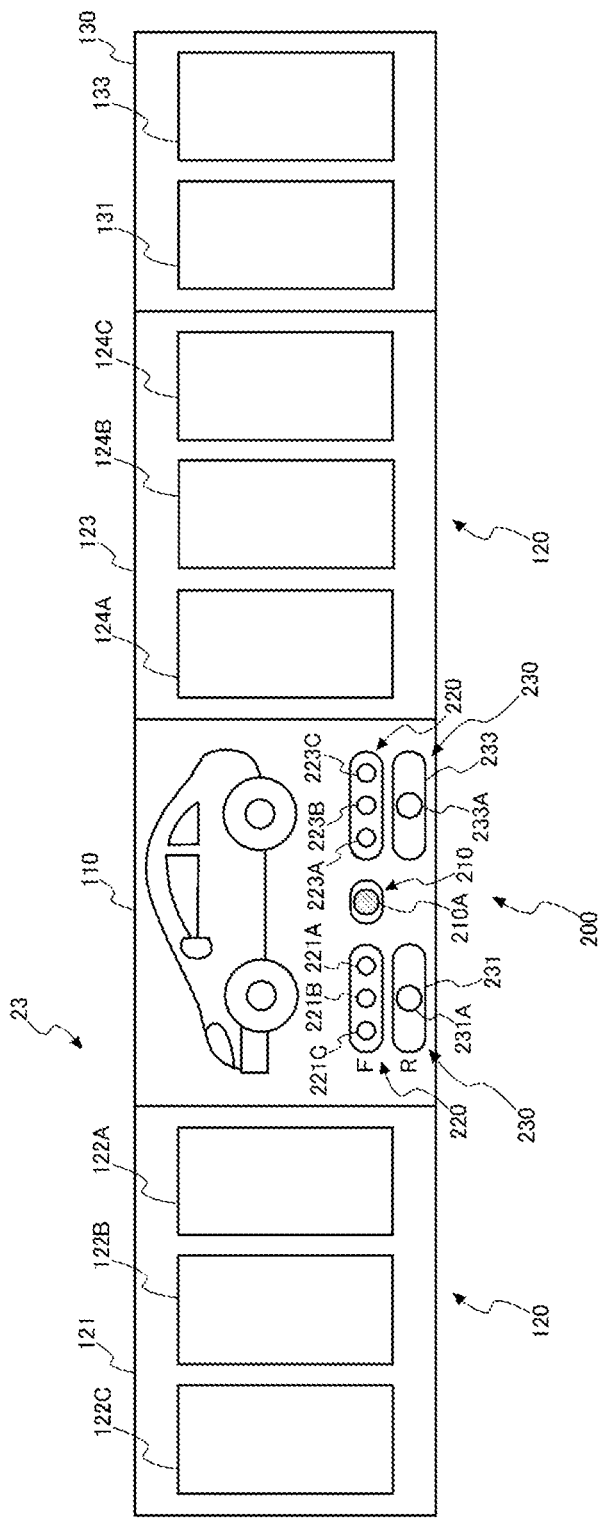
FIG. 5 is a diagram depicting a guide image that is displayed on a first screen.

FIG. 5 is a diagram depicting a guide image 200 that is displayed in the first screen 110.

Upon evaluation that the movement direction of the touch position is the first direction, the control unit 70 displays the guide image 200 on the first screen 110.

The guide image 200 includes a first guide image 210, a second guide image 220, and a third guide image 230.

The first guide image 210 includes a graphic image 210A of a prescribed shape. In FIG. 5, the prescribed shape indicates a circular graphic image 210A, but the shape of the graphic image 210A is arbitrary, and may instead be, for example, a polygon such as a triangle, a square, or the like. The graphic image 210A corresponds to the first screen 110, and if a display image is displayed in the entirety of the first screen 110, a display state of the graphic image 210A will be changed.

The second guide image 220 includes a second left guide image 221 that corresponds to the second left screen 121 and a second right guide image 223 that corresponds to the second right screen 123.

The second left guide image 221 includes left graphic images 221A, 221B, and 221C of a prescribed shape. In FIG. 5, the shape of the left graphic images 221A, 221B, and 221C is shown as a circle, but the shape of the left graphic images 221A, 221B, and 221C is arbitrary, and may instead be, for example, a polygon such as a triangle, a square, or the like.

The left graphic image 221A corresponds to the first left small display region 122A, and when a display image is displayed in the first left small display region 122A, a display state of the left graphic image 221A will be changed.

The left graphic image 221B corresponds to the second left small display region 122B, and when a display image is displayed in the second left small display region 122B, a display state of the left graphic image 221B will be changed.

The left graphic image 221C corresponds to the third left small display region 122C, and when a display image is displayed in the third left small display region 122C, a display state of the left graphic image 221C will be changed.

The second right guide image 223 includes right graphic images 223A, 223B, and 223C of a prescribed shape. In FIG. 5, the shape of the right graphic images 223A, 223B, and 223C is shown as a circle, but the shape of the right graphic images 223A, 223B, and 223C is arbitrary, and may instead be, for example, a polygon such as a triangle, a square, or the like.

The right graphic image 223A corresponds to the first right small display region 124A, and when a display image is displayed in the first right small display region 124A, a display state of the right graphic image 223A will be changed.

The right graphic image 223B corresponds to the second right small display region 124B, and when a display image is displayed in the second right small display region 124B, a display state of the right graphic image 223B will be changed.

The right graphic image 223C corresponds to the third right small display region 124C, and when a display image is displayed in the third right small display region 124C, a display state of the right graphic image 223C will be changed.

The third guide image 230 includes a third left guide image 231 a third right guide image 233.

The third left guide image 231 includes a graphic image 231A of a prescribed shape, and the third right guide image 233 includes a graphic image 233A of a prescribed shape.

In FIG. 5, a case is shown wherein the graphic images 231A and 233A are circles, but the shape of the graphic images 231A and 233A is arbitrary, and may instead be, for example, a polygon such as a triangle, a square, or the like.

The graphic image 231A corresponds to the first small display region 131, and when a display image is displayed in the first small display region 131, a display state of the graphic image 231A will be changed.

The graphic image 233A corresponds to the second small display region 133, and when a display image is displayed in the second small display region 133, a display state of the graphic image 233A will be changed.

When the guide image 200 is displayed in the first screen 110 through a display operation, the driver performs a movement operation for moving the display image, displayed in the first screen 110, to the second screen 120 or the third screen 130. The movement operation corresponds to a touch operation that has been set in advance, and a sliding operation. The movement operation is an operation wherein a finger, that is touching the first screen 110, is moved in a second direction. The second direction is a horizontal direction of the front seat display 21: the left direction or the right direction. The second direction need not be strictly horizontal, but rather may be, for example, diagonally upward to the right or diagonally downward to the right if the right direction, or diagonally upward to the left or diagonally downward to the left if the left direction.

When the display image is to be displayed on the second left screen 121, the driver moves the touching finger in the left direction. Moreover, if the display image that is displayed in the first screen 110 is to be displayed in the second right screen 123, the driver moves the touching the finger in the right direction.

Upon detection of the touch operation, the control unit 70 evaluates the direction of movement of the touch position through the touch operation that is detected. If the evaluated movement direction is the second direction, the control unit 70 evaluates that a movement operation has been detected, and based on the detected movement direction, evaluates which (of the second left screen 121, the second right screen 123, the left small display region 122, and the right small display region 124) was selected.

Based on the evaluation result, the control unit 70 causes the display image to be displayed in the entirety of the second left screen 121 or second right screen 123, or in the left small display region 122 or right small display region 124. Moreover, the control unit 70 changes, to a display state that is different from the display state of another guide image 200, the display state of the guide image 200 that corresponds to the entirety of the second left screen 121 or second right screen 123, or left small display region 122 or right small display region 124, that displays the display image.

When the display image is displayed in the entirety of the second left screen 121, the control unit 70 changes the display state of the second left guide image 221 to a display state that is different from the display state of the other graphic images. Specifically, the second left guide image 221 is lit or caused to blink.

When the display image is displayed in the first left small display region 122A, the control unit 70 changes the display state of the left graphic image 221A to a display state that is different from the display state of the other graphic images. Specifically, the left graphic image 221A is lit or caused to blink.

Additionally, when the display image is displayed in the second left small display region 122B, the control unit 70 changes the display state of the left graphic image 221B to a display state that is different from the display state of the other graphic images. Specifically, the left graphic image 221B is lit or caused to blink.

Additionally, when the display image is displayed in the third left small display region 122C, the control unit 70 changes the display state of the left graphic image 221C to a display state that is different from the display state of the other graphic images. Specifically, the left graphic image 221C is lit or caused to blink.

For the second right guide image 223 and the right graphic images 223A, 223B, and 223C, as well, the control unit 70 similarly changes the forms of display of these images to forms of display that are different from the forms of display of the other graphic images when a display image is displayed in the corresponding second right screen 123 or right small display region 124.

Moreover, the movement operation includes, in addition to the second direction, a first direction as well. Upon detection of a movement operation in the first direction, the control unit 70 causes the display image to be displayed in the back seat left display 35A or the back seat right display 35B. Upon detection of an operation wherein the touch position is moved from the bottom toward the top in a state wherein the guide image 200 is displayed in the first screen 110, the control unit 70 causes the display image to be displayed in the first small display region 131 or second small display region 133 of the third screen 130.

Figure 6:
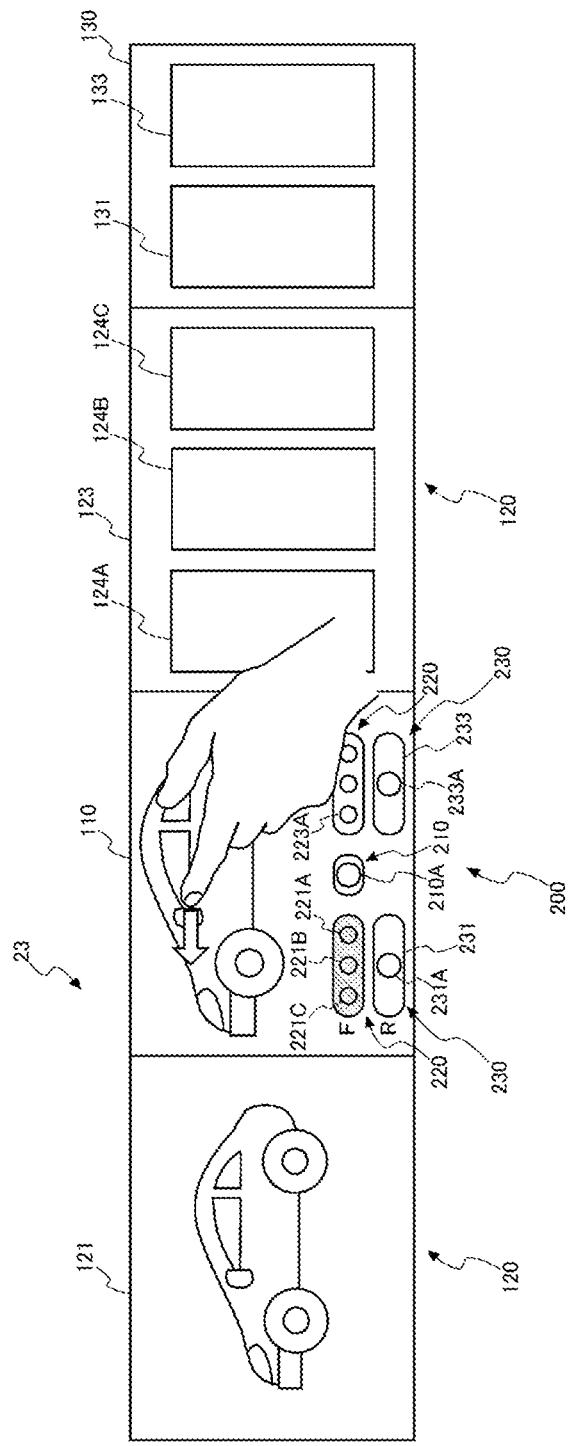
FIG. 6 is a diagram depicting a state wherein a display image is displayed on a first screen and a second screen.

FIG. 6 is a diagram depicting the state wherein the display image is displayed in the first screen 110 and the second left screen 121. The explanation will be for an operation in the case wherein the touch position is moved in the left direction, which is one second direction.

Upon evaluation that the movement direction of the touch position is the second direction, the control unit 70 displays, in the entirety of the screen of the second left screen 121, the display image that is displayed in the first screen 110. Moreover, the control unit 70 causes the entirety of the second left guide image 221, or the outer periphery thereof, to be lit or to blink. FIG. 6 shows a state wherein the display image is displayed in the entirety of the screen of the first screen 110 and the second left screen 121, and the entirety, or outer periphery, of the second left guide image 221 is lit or caused to blink.

Note that when the display image is displayed in the entire screen of the second left screen 121, the control unit 70 may remove the left small display region 122 from the second left screen 121.

Additionally, upon detection of the right direction as the second direction, the control unit 70 displays the display image in the entire screen of the second right screen 123 and causes the entirety, or the outer periphery, of the second right guide image 223 to be lit or to blink.

Figure 7:
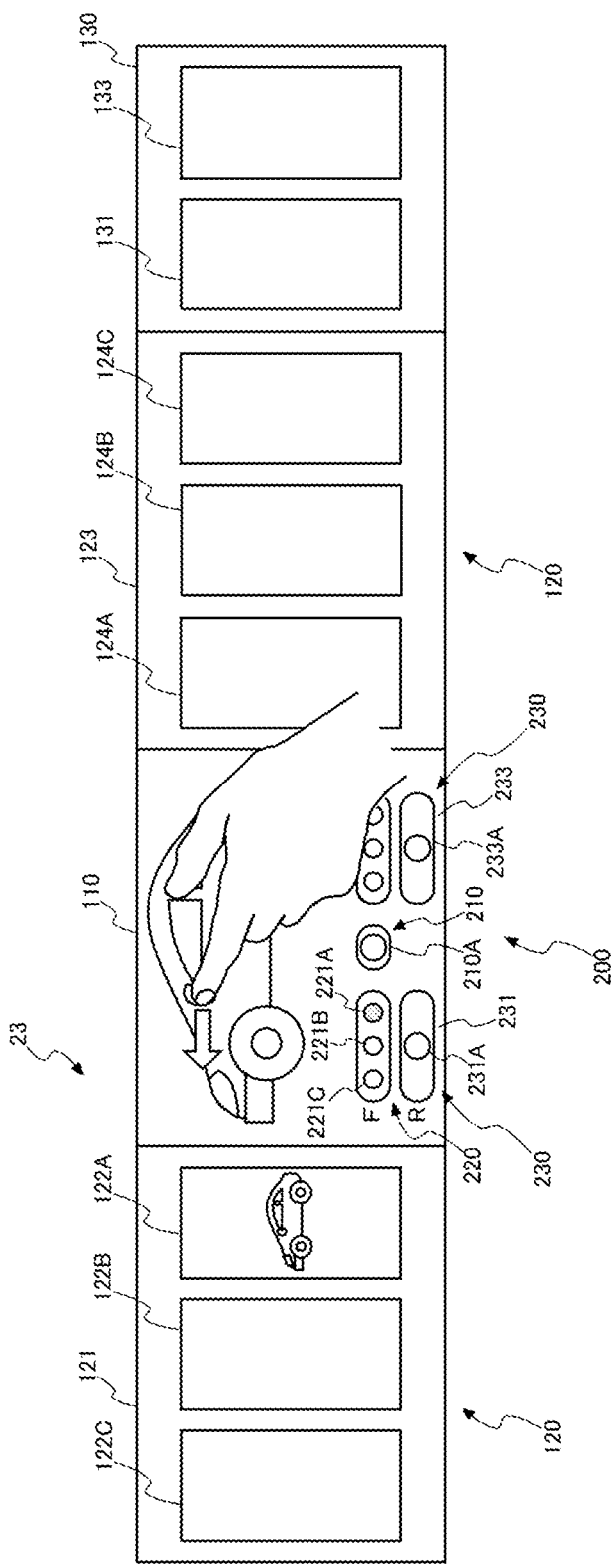
FIG. 7 is a diagram depicting a state wherein a display image is displayed in a first screen and in a first small display region of a second screen.

FIG. 7 is a diagram depicting the state wherein the display image is displayed in the first screen 110 and the first left small display region 122A.

When, in the state wherein the display image is displayed in the entirety of the second left screen 121, depicted in FIG. 6, movement of the touch position in the left direction, which is the second direction, is further detected, the control unit 70 causes the display image that is displayed in the entirety of the screen of the second left screen 121 to be displayed in the first left small display region 122A. While in this case the display image that is displayed in the entire screen of the second left screen 121 is removed, it is not removed from the first screen 110. Moreover, the control unit 70 changes the display state of the second left guide image 221 from a form wherein the entirety, or the outer periphery, of the second left guide image 221 is lit or caused to blink to a state wherein the left graphic image 221A is lit or caused to blink.

Figure 8:
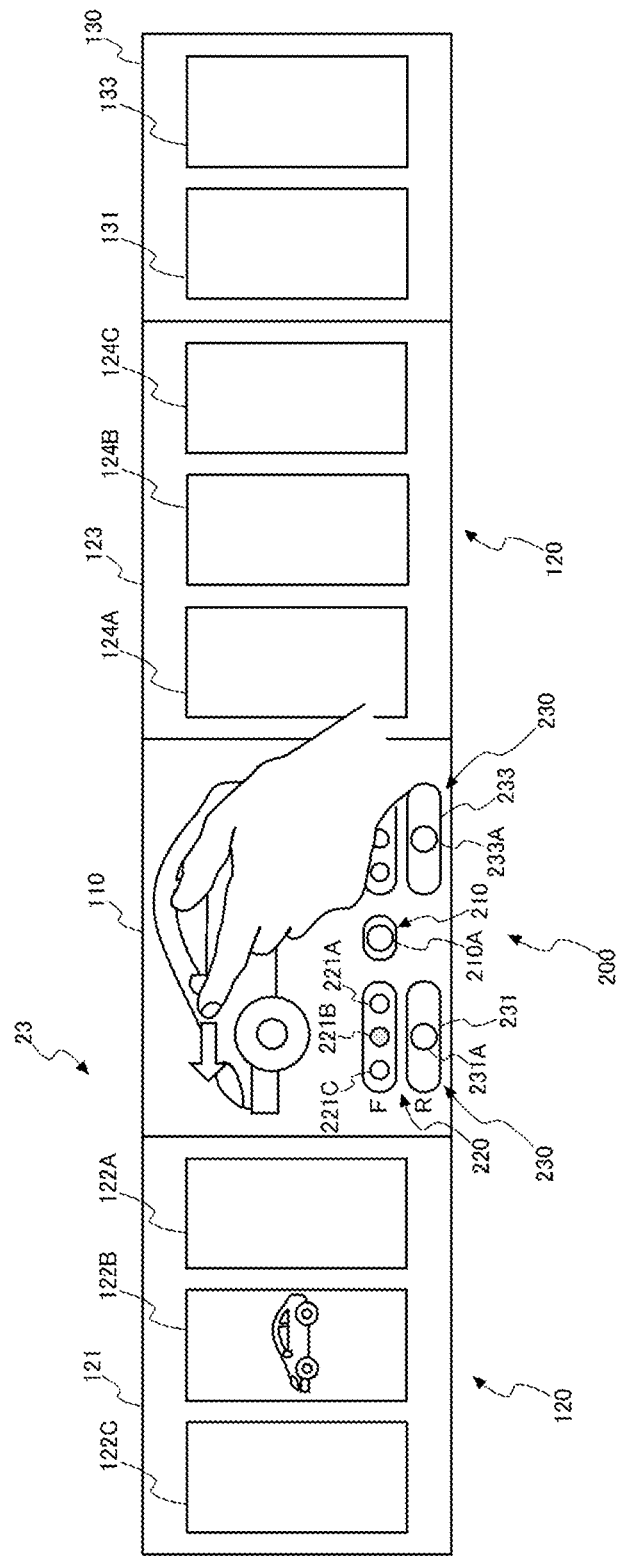
FIG. 8 is a diagram depicting a state wherein a display image is displayed in a first screen and in a second small display region of a second screen.

FIG. 8 is a diagram depicting the state wherein a display image is displayed in the first screen 110 and the second left small display region 122B.

When, in the state wherein the display image is displayed in the first left small display region 122A, depicted in FIG. 7, movement of the touch position in the left direction, which is the second direction, is further detected, the control unit 70 causes the display image that is displayed in the first left small display region 122A to be displayed in the second left small display region 122B. While in this case the display image that was displayed in the first left small display region 122A is removed, it is not removed from the first screen 110. Moreover, the control unit 70 changes the display state of the second left guide image 221 from a form wherein the left graphic image 221A is lit or caused to blink to a state wherein the left graphic image 221B is lit or caused to blink.

Figure 9:
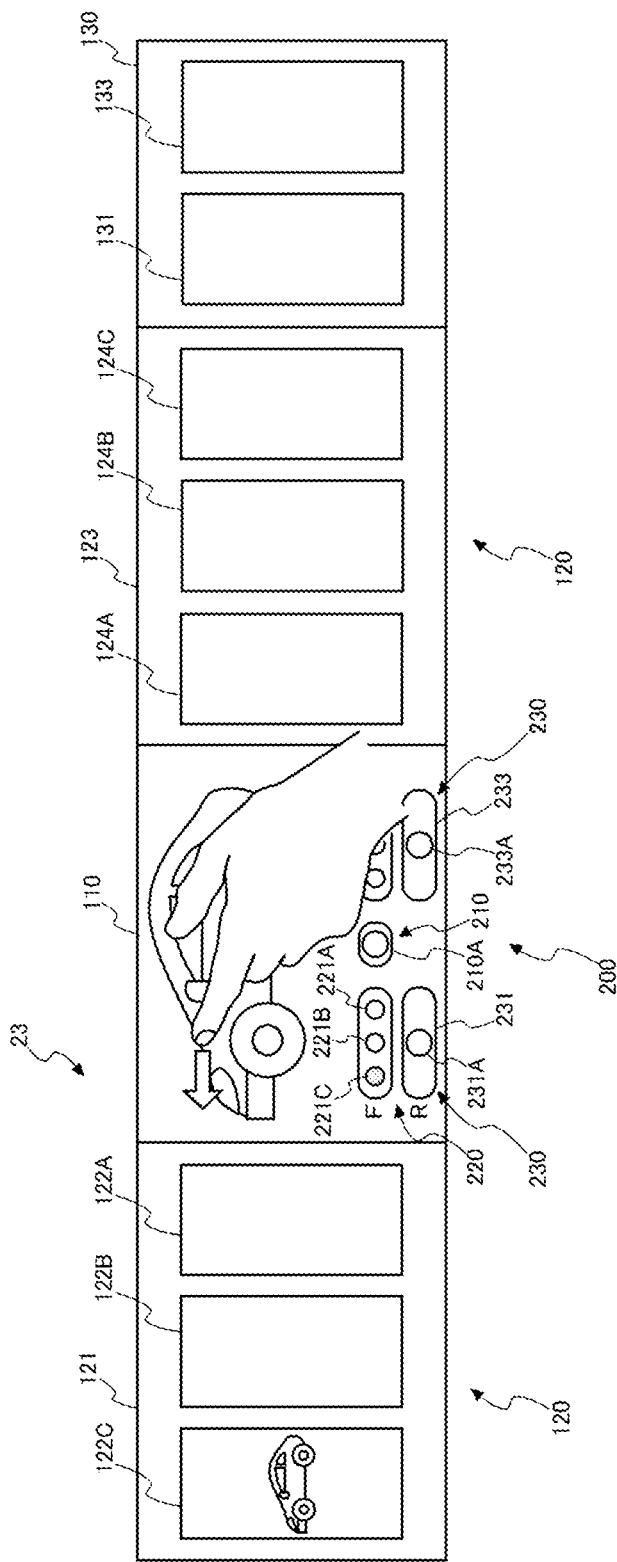
FIG. 9 is a diagram depicting a state wherein a display image is displayed in a first screen and in a third small display region of a second screen.

FIG. 9 is a diagram depicting the state wherein a display image is displayed in the first screen 110 and the third left small display region 122C.

When, in the state wherein the display image is displayed in the second left small display region 122B, depicted in FIG. 8, movement of the touch position in the left direction, which is the second direction, is further detected, the control unit 70 causes the display image that is displayed in the second left small display region 122B to be displayed in the third small display region 122C. While in this case the display image that was displayed in the second left small display region 122B is removed, it is not removed from the first screen 110. Moreover, the control unit 70 changes the display state of the second left guide image 221 from a form wherein the left graphic image 221B is lit or caused to blink to a state wherein the left graphic image 221C is lit or caused to blink.

While the drawings are schematic, in the state wherein the display image is displayed in the first screen 110, if movement of the touch position in the right direction, which is the second direction, is detected, the control unit 70 causes the display image to be displayed in the entirety of the screen of the second right screen 123. Additionally, the control unit 70 causes the entirety of the second right guide image 223, or the outer periphery thereof, to be lit or to blink.

When, in the state wherein the display image is displayed in the entirety of the second right screen 123, movement of the touch position in the right direction is further detected, the control unit 70 causes the display image to be displayed in the first right small display region 124A, and changes the display state of the second right guide image 223 to a form wherein the right graphic image 223A is lit or caused to blink.

Additionally when, in the state wherein the display image is displayed in the first right small display region 124A, movement of the touch position in the right direction is further detected, the control unit 70 causes the display image to be displayed in the second right small display region 124B, and changes the display state of the second right guide image 223 to a form wherein the right graphic image 223B is lit or caused to blink.

Additionally when, in the state wherein the display image is displayed in the second right small display region 124B, movement of the touch position in the right direction is further detected, the control unit 70 causes the display image to be displayed in the third right small display region 124C, and changes the display state of the second right guide image 223 to a form wherein the right graphic image 223C is lit or caused to blink.

Figure 10:
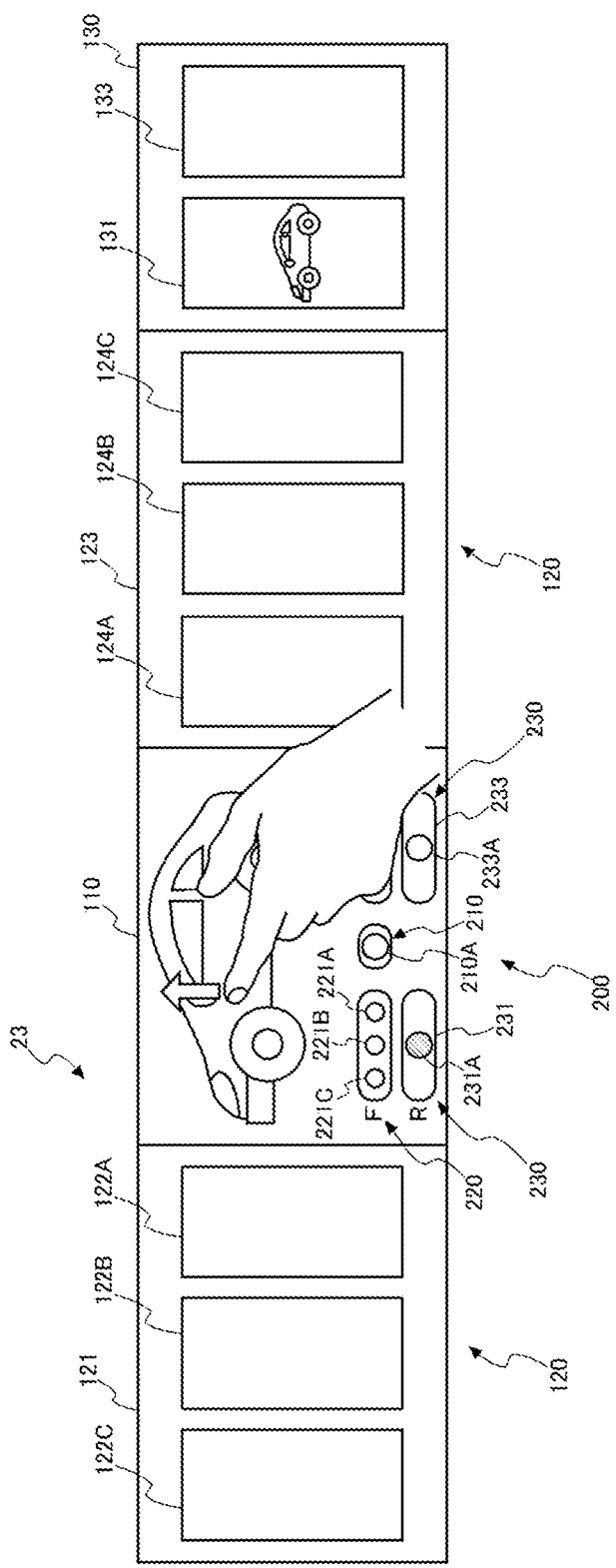
FIG. 10 is a diagram depicting a state wherein a display image is displayed in a first screen and in a first small display region of a third screen.

FIG. 10 is a diagram depicting the state wherein the display image is displayed in the first screen 110 and the first small display region 131 of the third screen 130.

When the display image is to be displayed in the third screen 130, the driver performs a movement operation wherein the touching the finger is moved in the first direction.

Upon evaluation, based on operation information inputted from the touch sensor 22, that the movement direction of the touch position is the first direction, the control unit 70 causes the display image that is displayed in the first screen 110 to be displayed in the first small display region 131 or the second small display region 133 of the third screen 130.

Upon detection of movement of the touch position in the first direction, in a state wherein the display image is displayed in only the first screen 110, the control unit 70 displays the display image on the back seat right display 35B or back seat left display 35A that has been set in advance. Additionally, the control unit 70 causes the display image to be displayed in the first small display region 131 or second small display region 133 that corresponds to the back seat right display 35B or back seat left display 35A wherein the display image is displayed. Moreover, the control unit 70 causes the third left guide image 231 or the third right guide image 233, which corresponds to the first small display region 131 or second small display region 133 wherein the display image is displayed, to be lit or to blink.

FIG. 10 displays the state wherein the display image is displayed in the first small display region 131 and the graphic image 233A is displayed in a lit or blinking state.

Figure 11:
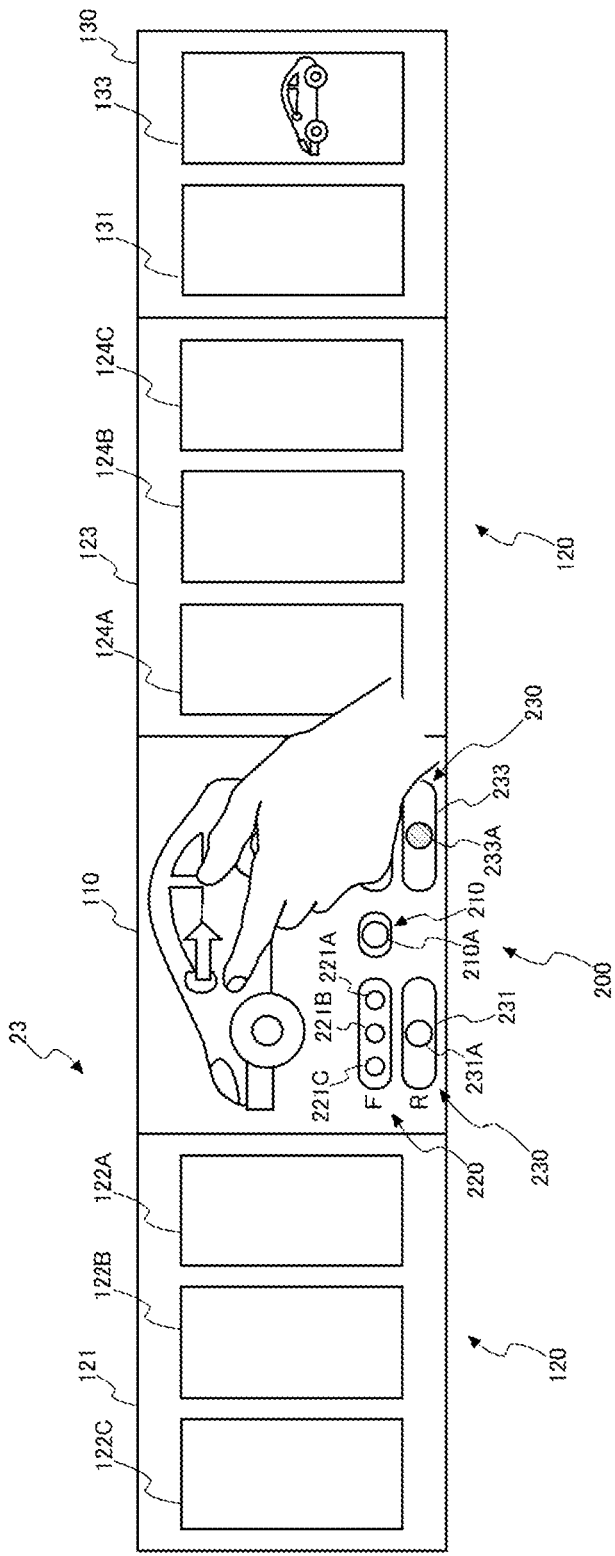
FIG. 11 is a diagram depicting a state wherein a display image is displayed in a first screen and in a second small display region of a third screen.

FIG. 11 is a diagram depicting the state wherein the display image is displayed in the first screen 110 and the second small display region 133 of the third screen 130.

The operation for causing the display image that is displayed in the back seat left display 35A and the first small display region 131 to be moved to the back seat right display 35B and the second small display region 13 will be explained next.

The driver performs an operation, as the movement operation for moving the touch position in the second direction, wherein the finger that touches the first screen 110 is removed from the left to the right.

Upon detection of an operation wherein the touch position is moved from the left to the right, the control unit 70 causes the display image that is displayed in the back seat left display 35A and the first small display region 131 to be displayed in the back seat right display 35B and the second small display region 133. In this case, the display image that was displayed in the back seat left display 35A and the first small display region 131 is removed.

Additionally, when displaying, on the back seat left display 35A and the first small display region 131, the display image that is displayed in the back seat right display 35B and the second small display region 13, the driver performs an operation wherein the finger that is touched on the first screen 110 is moved from the right to the left.

Upon detection of an operation wherein the touch position is moved from the right to the left, the control unit 70 causes the display image that is displayed in the back seat right display 35B and the second small display region 133 to be displayed in the back seat left display 35A and the first small display region 131. In this case, the display image that was displayed in the back seat right display 35B and the second small display region 133 is removed.

When the driver performs a movement operation to indicate the display image to be moved onto a screen or small display region, the driver next inputs a confirmation operation to confirm the display state for the front seat display 21 or the front seat display 21 and the back seat display 35.

In the present embodiment, the confirmation operation is an operation wherein the finger that is touching the first screen 110 is removed from the first screen 110. If a state wherein no touch position is detected is continued for at least a prescribed time, the control unit 70 evaluates that a confirmation operation has been detected.

The control unit 70 confirms, as the screen for displaying the display image, the second left screen 121, second right screen 123, or third screen that was displayed the display image immediately prior to detection of the confirmation operation. Moreover, when the guide image 200 is removed from the first screen 110 and the display image is displayed in the second left screen 121, the second right screen 123, or the third screen, the control unit 70 removes the display image from the first screen 110.

Additionally, after the confirmation operation has been received, the control unit 70 may evaluate, based on the attributes of the display image, whether or not the display image has been removed from the first screen 110. For example, if the display image is a playback image for a DVD or Blu-ray®, or the like, then even after the display image is displayed in the second screen 120 or the third screen 130 and the confirmation operation is received, the display image may continue to be displayed in the first screen 110. Moreover, if the display image is a captured image from a camera, the display image that is displayed in the first screen 110 may be removed upon display of the display image in the second screen 120 or third screen 130 and reception of the confirmation operation.

Moreover, to cancel a movement operation, the driver moves, in the third direction, the finger that touches the first screen 110.

In the present embodiment, the third direction is the direction wherein the touch position is moved from the top toward the bottom. The third direction is not limited to movement of the touch position from the top toward the bottom, but instead may be movement from the bottom toward the top, or the direction wherein the finger is rotated to the left or rotated to the right. Moreover, the cancel operation may be evaluated through a number of taps on the first screen 110.

Upon detection of movement of the touch position in the third direction, the control unit 70 returns, to the initial state depicted in FIG. 4, the display state of any of FIG. 5 through FIG. 11. In this case, after detection of movement of the touch position in the third direction, the display of the guide image 200 may also be removed when the finger of the driver is removed from the first screen 110.

Figure 12:
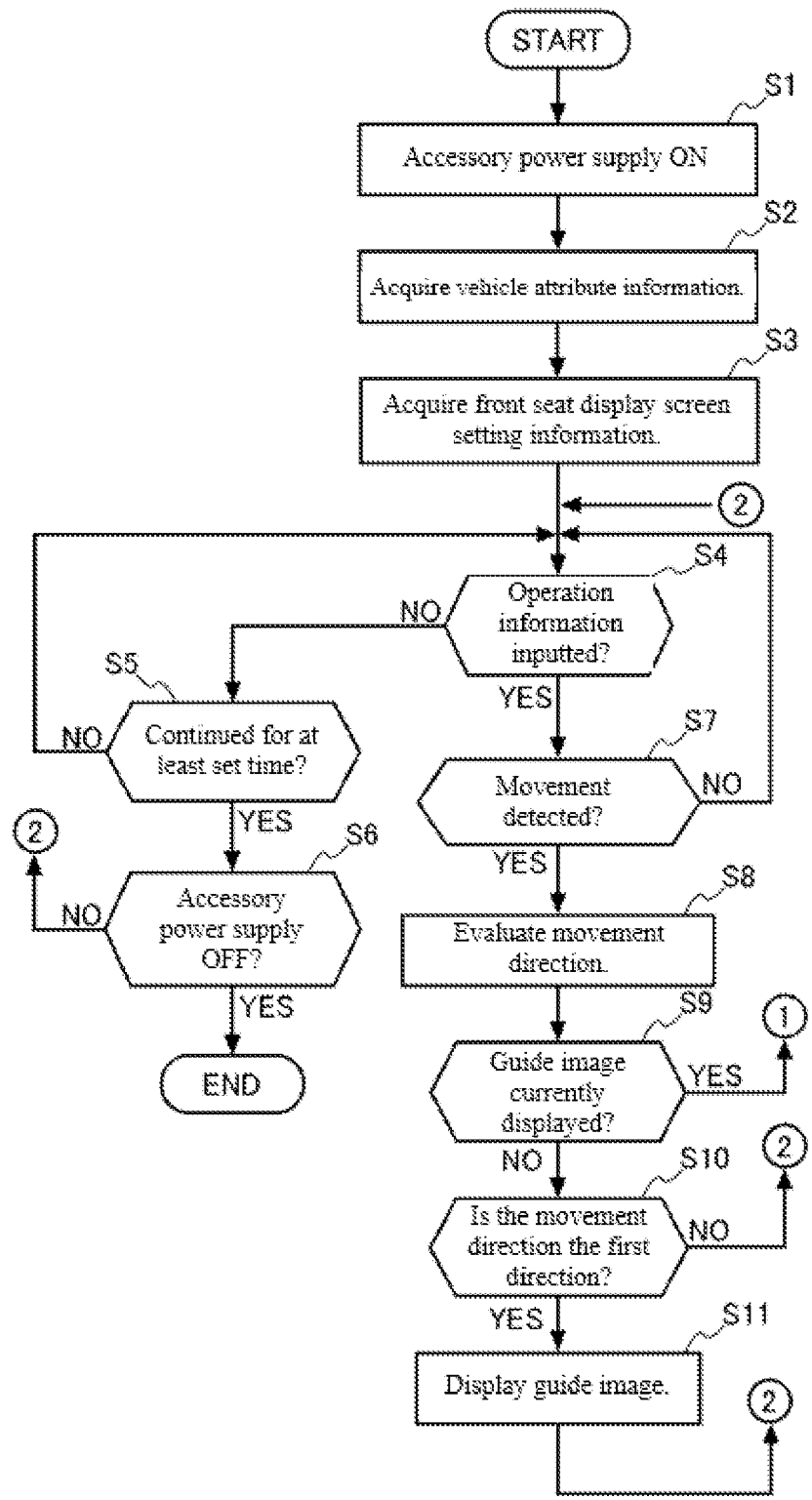
FIG. 12 is a flowchart showing the operations of a display ECU.
Figure 13:
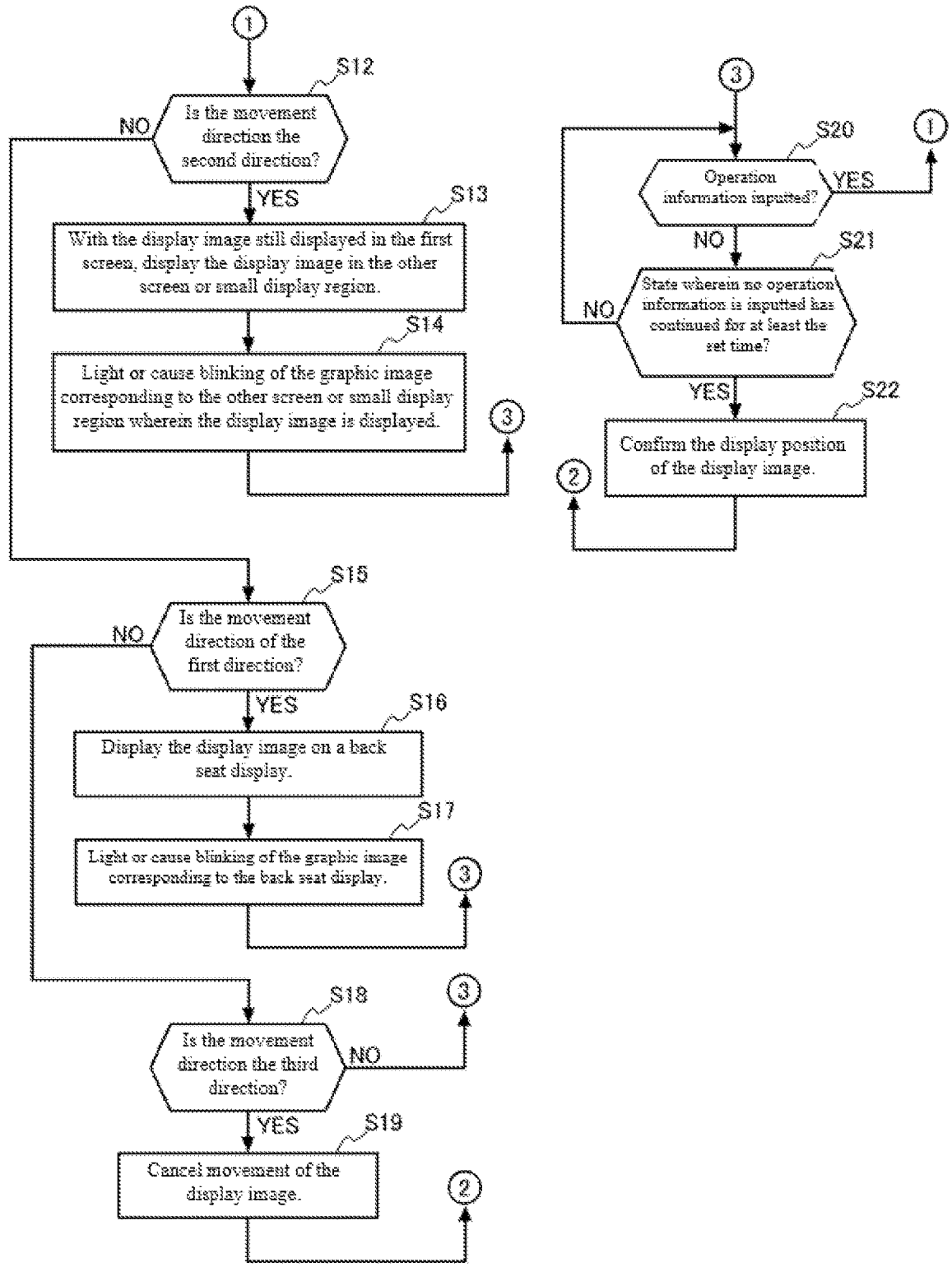
FIG. 13 is a flowchart showing the operations of a display ECU.

FIG. 12 and FIG. 13 are flowcharts showing operations of the display ECU 50. The operation of the display ECU 50 will be explained in reference to the flowcharts shown in FIG. 12 and FIG. 13.

When the accessory power supply is turned ON (Step S1), the display ECU 50 reads out the vehicle attribute information from the memory unit 71 (Step S2), and reads out the screen setting operation for the front seat display 21 (Step S3). The display ECU 50 evaluates, through the attribute information that has been read out, the configuration state of the display device installed in the vehicle. That is, the display ECU 50 evaluates whether the display device is provided in only the first row of the vehicle, or whether display devices are provided in the second row as well. Moreover, the display ECU 50 sets up each of the screens, for the first screen 110, the second screen 120, and the third screen, in the front seat display 21 from the screen setting information.

Following this, the display ECU 50 evaluates whether or not operation information has been inputted from the touch sensor 22 (Step S4). If no operation information has been inputted (Step S4/NO), the display ECU 50 evaluates whether or not the state wherein no operation information has been inputted has continued for at least a set time that has been set in advance (Step S5). If the state wherein no operation information has been inputted has not continued for at least the set time (Step S5/NO), the display ECU 50 returns to the evaluation of Step S4 to evaluate whether or not operation information has been inputted from the touch sensor 22.

Moreover, if the state wherein no operation information is inputted from the touch sensor 22 has continued for at least the set time (Step S5/YES), the display ECU 50 evaluates whether or not the accessory power supply of the vehicle has been turned OFF (Step S6). If the vehicle accessory power supply has not been turned OFF (Step S6/NO), the display ECU 50 returns to the evaluation of Step S4 and waits until operation information is inputted from the touch sensor 22. If the accessory power supply of the vehicle has been turned OFF (Step S6/YES), the display ECU 50 terminates the process flow and stores, in the memory unit 71, any data requiring storage.

When operation information is inputted (Step S4/YES), the display ECU 50 evaluates whether or not movement of the touch position has been detected, from the operation information that is inputted sequentially from the touch sensor 22 (Step S7). If movement of the touch position has not been detected (Step S7/NO), the display ECU 50 returns to the evaluation of Step S4, and continues to evaluate whether or not operation information has been inputted.

If movement of the touch position has been detected (Step S7/YES), the display ECU 50 evaluates the movement direction of the touch position (Step S8). Thereafter, the display ECU 50 evaluates whether or not the guide image 200 is displayed in the first screen 110 (Step S9). If the guide image 200 is not displayed in the first screen 110 (Step S9/NO), the display ECU 50 evaluates whether or not the movement direction of the touch position, evaluated in Step S8, is the first direction (Step S10).

If the movement direction of the touch position is evaluated as the first direction (Step S10/YES), the display ECU 50 causes the guide image 200 to be displayed in the first screen 110 (Step S11), and returns to the evaluation of Step S4 to continue to evaluate whether or not operation information has been inputted.

The operation by the display ECU 50 when there has been an evaluation that the guide image 200 is displayed in the first screen 110 will be explained next in reference to the flowchart shown in FIG. 13.

Upon evaluation that the guide image 200 is displayed in the first screen 110 (Step S9/YES), the display ECU 50 evaluates whether or not the movement direction of the touch position is the second direction (Step S12). If the movement direction of the touch position is the second direction (Step S12/YES), the display ECU 50 evaluates that a movement operation has been detected. In this case, with the display image still displayed in the first screen 110, the display ECU 50 causes the display image to be displayed in the second left screen 121, the second right screen 124, the left small display region 122, or the right small display region 124, corresponding to the second direction.

For example, if the second direction is the left direction and the display image is displayed in only the first screen 110, the display ECU 50 causes the display image to be displayed in the entire screen of the second left screen 121 while the display image is still displayed in the first screen 110.

Additionally, if the display image is displayed in the first screen 110 and the first left small display region 122A, the display ECU 50 moves, to the second left small display region 122B, the display image that was displayed in the first left small display region 122A. In this case, the display image that is displayed in the first screen 110 continues to be displayed until a confirmation operation is performed.

Moreover, the display ECU 50 causes the graphic image to be lit or to blink (Step S14).

The display ECU 50 causes lighting or flashing of the graphic image corresponding to the second left screen 121, the second right screen 124, the left small display region 122, or the right small display region 124 wherein the display image was displayed in Step S13.

For example, if the display image is displayed in the entire screen of the second left screen 121, the display ECU 50 causes the entirety, or the outer periphery, of the second left guide image 221 to be lit or to blink. Moreover, if the display image is displayed in the second left small display region 122B, the display ECU 50 causes the left graphic image 221B to be lit or to blink.

If the movement direction of the touch position is not the second direction (Step S12/NO), the display ECU 50 evaluates whether or not the movement direction of the touch position is the first direction (Step S15).

Upon evaluation that the movement direction of the touch position is the first direction (Step S15/YES), the display ECU 50 displays the display image in the back seat display 35 (Step S16). For example, if, prior to detection of movement in Step S7, the display image is displayed in only the first screen 110, the display ECU 50 causes the display image to be displayed in the back seat right display 35B or the back seat left display 35A, which has been set in advance.

Moreover, if the display image is not displayed in either the second left screen 121 or the left small display region 122 prior to detection of movement in Step S7, the display ECU 50 displays the display image in the back seat left display 35A.

Moreover, if the display image is not displayed in either the second right screen 123 or the right small display region 124 prior to detection of movement in Step S7, the display ECU 50 displays the display image in the back seat right display 35B.

The display ECU 50 then causes lighting or blinking of the graphic image 231A or 233A that corresponds to the back seat display 35 wherein the display image is displayed (Step S17), and moves to the evaluation in Step S20.

Upon evaluation that the movement direction of the touch position is not the first direction (Step S15/NO), the display ECU 50 evaluates whether or not the movement direction of the touch position is the third direction (Step S18). If the movement direction of the touch position is not the third direction (Step S18/NO), the display ECU 50 moves to the evaluation in Step S20.

Additionally, upon evaluation that the movement direction of the touch position is the third direction (Step S18/YES), the display ECU 50 cancels the display position that was moved in Step S13 or Step S17, and returns the display image to the original position (Step S19). Thereafter, the display ECU 50 returns to Step S4 in the flowchart shown in FIG. 12.

Following this, the display ECU 50 evaluates whether or not operation information has been inputted from the touch sensor 22 (Step S20). If no operation information has been inputted (Step S20/NO), the display ECU 50 evaluates whether or not the state wherein no operation information has been inputted has continued for at least a set time that has been set in advance (Step S21). If the state wherein no operation information has been inputted has not continued for at least the set time (Step S21/NO), the display ECU 50 returns to the evaluation of Step S20 to evaluate whether or not operation information has been inputted from the touch sensor 22.

Moreover, if the state wherein operation information has not been inputted has continued for at least the set time (Step S21/YES), the display ECU 50 confirms the display position of the display image that was moved in Step S13 or Step S16 (Step S22), and returns to the evaluation of Step S4, shown in FIG. 12.

As explained above, the display ECU 50 according to the present embodiment controls the display of the first screen 110 and the second screen 120.

The display ECU 50 executes the individual steps of a detecting step, an evaluating step, and a displaying step.

The detecting step detects a movement operation, which is a touch operation that has been set in advance, for the first screen 110.

Upon detection of the movement operation, the evaluating step evaluates whether, of the left small display region 122 or the right small display region 124 that are set in the second screen 120, the left small display region 122 or the right small display region 124 has been selected.

The displaying step displays, in the left small display region 122 or the right small display region 124 that, in the evaluating step, has been evaluated as having been selected, the display image that is displayed in the first screen 110.

Consequently, it is possible to perform a touch operation, that has been set in advance, on the first screen 110 to select the left small display region 122 or the right small display region 124, and to display the display image in the selected left small display region 122 or right small display region 124.

Upon detection of a display operation that is another touch operation, that is not a movement operation, on the first screen 110, the ECU 50 displays, in the first screen 110, a guide image 200 that displays whether or not the display image is displayed in the left small display region 122 or the right small display region 124, displayed corresponding to the left small display region 122 and the right small display region 124.

Consequently, viewing the guide image 200 that is displayed in the first screen 110 makes it possible to check what screen the display image is displayed on, without moving one's gaze line to the second screen.

The guide image 200 includes left graphic images 221A through 221C that correspond to each of the left left small display regions 122 and right graphic images 223A through 223C that correspond to each of the right right small display regions 124.

The display ECU 50 changes a display state of the left graphic images 221A through 221C of the left graphic image, corresponding to the left small display region 122, or of the right graphic images 223A through 223C, corresponding to the right small display region 124, selected by the evaluating step, to a display state that is different from the display state of the other graphic images 221A through 221C or 223A through 223C.

Consequently, the vehicle occupant is able to identify, by the display state of the graphic image, the left small display region 122 or right small display region 124 wherein the display image is displayed.

A selecting sequence is set for the left left small display regions 122 and right right small display regions 124, based on their distances from the first screen 110.

The left graphic images 221A through 221C are arranged lined up in a sequence corresponding to the selecting sequence for the left left small display regions 122. The right graphic images 223A through 223C are arranged lined up in a sequence corresponding to the selecting sequence for the right right small display regions 124.

Consequently, it is possible for the vehicle occupant to identify the left left small display region 122 to which the display image will be moved next through a movement operation, through the order in which the left graphic images 221A through 221C are lined up.

Similarly, it is possible for the vehicle occupant to identify the right right small display region 124 to which the display image will be moved next through a movement operation, through the order in which the right graphic images 223A through 223C are lined up.

Moreover, the first screen 110 and the second screen 120 are displayed in the front seat display 21 that is installed in the vehicle, where the second screen 120 is arranged at a position that is further from the driver, who is seated in the driver seat, than the first screen 110.

Consequently, the left small display region 122 or right small display region 124 of the second screen 120, for displaying the display image, can be selected through a touch operation on the first screen 110 that is near to the driver seat.

The embodiment set forth above is no more than an illustration of one form of the present invention, and the present invention may be modified and applied appropriately in a range that does not deviate from the spirit and intent thereof.

For example, the display position of the display image may instead be set through a single operation for returning to one step earlier.

For example, if a prescribed operation is detected after the display image has been moved from the first left small display region 122A to the second left small display region 122B, the display image would be returned from the second left small display region 122B to the first left small display region 122A.

The operation for returning to one earlier may be through displaying a marker image that is displayed at a coordinate that has been set in advance, for example, where if the touch position is moved further to the outside that the display position of the marker image on the first screen 110, the evaluation may be that the operation for returning to one earlier has been detected.

For example, a marker image is displayed at a position that is moved by a prescribed distance toward the center from a left edge that faces the first screen 110 when the second direction is the left direction. By moving the finger further to the left side than the display position of the marker image, the control unit 70 can be caused to return, to the immediately previous state, the movement operation that has been inputted.

Moreover, a marker image is displayed at a position that is moved by a prescribed distance toward the center from a right edge that faces the first screen 110 when the second direction is the right direction. By moving the finger further to the right side than the display position of the marker image, the control unit 70 can be caused to return, to the immediately previous state, the movement operation that has been inputted.

In the embodiment set forth above an example was displayed wherein the front seat display 21 comprised a single display surface 23, and the display surface 23 was divided in 3: a first screen 110, a second screen 120, and a third screen 130.

The first screen 110, the second screen 120, and the third screen 130 may each be structured so as to be displayed in its own display, or the structure may be one wherein the first screen 110 and the second screen 120 are displayed in the same display and the third screen 130 is displayed in a single display. Moreover, the structure may be such that the second screen 120 and the third screen are displayed in the same display and the first screen 110 is displayed in a single display.

Moreover, while, in the embodiment set forth above, the explanation was for a case wherein a control program for causing execution, in the control unit 70, of control corresponding to the display controlling method was stored in a memory unit 71, the present invention is not limited thereto. Instead, a control program may be downloaded from a network through a communication device that is mounted in the vehicle, with the downloaded control program stored in the memory unit 71. Moreover, the structure may be one wherein there is loading, to the memory unit 71, from a storage medium that is connected to the display ECU 50.

Moreover, for ease in understanding the application of the present invention, FIG. 1 is a schematic diagram illustrated partitioned according to the main processing content; however the individual structures of the display system 1 may be partitioned into more structural elements depending on the processing detail. Moreover, the partitioning may be such that more processes are carried out by a single structural element. Moreover, the processes in any of the structural elements may be executed in a single hardware or executed by a plurality of hardware. Moreover, the processes of each structural element may be achieved by a single program, or by a plurality of programs.

Additionally, for ease in understanding the processes of the display ECU 50, the processing units in the flowcharts given in FIG. 12 and FIG. 13 are partitioned according to the main processing details. The invention according to the present application is not limited by the names of the processing units or the methods by which they are partitioned. The processes of the display ECU 50 may be partitioned into a greater number of processing units, depending on the processing details. Moreover, a single processing unit may be further partitioned so as to include multiple processes. Furthermore, the processing sequence in the flowchart is also not limited to the example that is illustrated.

EXPLANATION OF REFERENCE SYMBOLS

1: Display System
10: Camera
20: First Display Device
21: Front Seat Display
22: Touch Sensor
23: Display Surface
25: Dashboard
27: Steering Wheel
30: Second Display Device
35: Back Seat Display
35A: Back Seat Left Display
35B: Back Seat Right Display
60: Interface
70: Control unit
71: Memory unit
73: Processor
110: First Screen
120: Second Screen
121: Second Left Screen
123: Second Right Screen
130: Third Screen
200: Guide Image
210: First Guide Image
210A: Graphic Image
220: Second Guide Image
221: Second Left Guide Image
221A: Left Graphic Image
221B: Left Graphic Image
221C: Left Graphic Image
223: Second Right Guide Image
223A: Right Graphic Image
223B: Right Graphic Image
223C: Right Graphic Image
230: Third Guide Image
231: Third Left Guide Image
231A: Graphic Image
233: Third Right Guide Image
233A: Graphic Image

What is claimed is:

1. A display controlling method for controlling display of a first screen and of a second screen, comprising:
   a detecting step for detecting a predetermined touch operation on a first screen;
   an evaluating step for evaluating which display region has been selected by the predetermined touch operation among a plurality of display regions set on the second screen in response to the detection of the predetermined touch operation; and
   a displaying step for displaying, a display image in the display region evaluated as having been selected by the evaluating step, the display image is an image that has been displayed in the first screen, wherein:
   upon detection of another touch operation other than the predetermined touch operation on the first screen, a guide image that indicates whether or not display images are displayed in the plurality of display regions is displayed in the first screen corresponding to each of the plurality of display regions, and the other touch operation is a sliding operation sliding a touch position on the first screen to a predetermined first direction.

2. The display controlling method according to claim 1, wherein:
   the guide image includes a plurality of graphic images corresponding to each of the plurality of display regions; and
   a display appearance of a graphic image corresponding to the display region evaluated as selected in the evaluating step is changed to another display appearance in response to the evaluation.

3. The display controlling method according to claim 2, wherein:
   a selecting sequence is set for the plurality of display regions based on distances of the plurality of display regions from the first screen; and
   the plurality of graphic images is arranged lined up in a sequence corresponding to the selecting sequence.

4. The display controlling method according to claim 1, wherein:
   the predetermined touch operation is a sliding operation sliding the touch position on the first screen to a second direction different from the predetermined first direction.

5. The display controlling method according to claim 1, wherein:
   the first screen and the second screen are displayed in a display device installed in a vehicle; and
   the second screen is arranged at a position further than the first screen from a driver seated in a driver seat.

\* \* \* \* \*